United States Patent [19]
Engh

[11] 3,912,318
[45] Oct. 14, 1975

[54] SELF-CLOSING LIFT HOOK
[75] Inventor: Duncan C. Engh, Red Wing, Minn.
[73] Assignee: D. B. Enterprises, Inc., Red Wing, Minn.
[22] Filed: June 27, 1974
[21] Appl. No.: 483,702

[52] U.S. Cl. .............. 294/82 R; 24/241 PL; 24/242
[51] Int. Cl.² .......................................... B66C 1/36
[58] Field of Search ............. 294/78 R, 82 R, 83 R;
24/230.5 R, 230.5 AC, 230.5 CR, 230.5 S,
230.5 SS, 230.5 SA, 232–239, 241 R, 241
PL, 241 P, 241 PP, 241 TC, 241 SB, 241 CH,
241 SL, 242

[56] References Cited
UNITED STATES PATENTS

| | | | |
|---|---|---|---|
| 1,394,068 | 10/1921 | Cousins | 24/238 |
| 1,583,326 | 5/1926 | Waller | 24/239 |
| 1,657,260 | 1/1928 | Holt | 294/82 R |
| 2,357,054 | 8/1944 | Muddiman | 294/83 R |
| 2,493,282 | 1/1950 | Criswell | 24/232 X |
| 2,783,518 | 3/1957 | Anderson | 24/241 PL |
| 3,820,204 | 6/1974 | Scarpa | 24/232 |

*Primary Examiner*—Evon C. Blunk
*Assistant Examiner*—Johnny D. Cherry

[57] ABSTRACT

A lift hook device for use with cranes and hoists, comprised of a cable attachment eye and a hook, with the shank of the hook being threadedly engaged with a positioning thread formed on an aperture in the base wall of the eye through which the hook shank extends. The positioning thread is so formed that when the eye and hook are rotated relative to each other to displace a latch arm depending from the eye to an open position relative to the hook tip, the eye will move downwardly relative to the hook shank. The application of a downward load force on the hook causes the eye to rotate upwardly on the hook shank to a closed position wherein the latch arm on the eye is aligned with the hook tip and closes the hook throat opening.

10 Claims, 5 Drawing Figures

U.S. Patent  Oct. 14, 1975  3,912,318
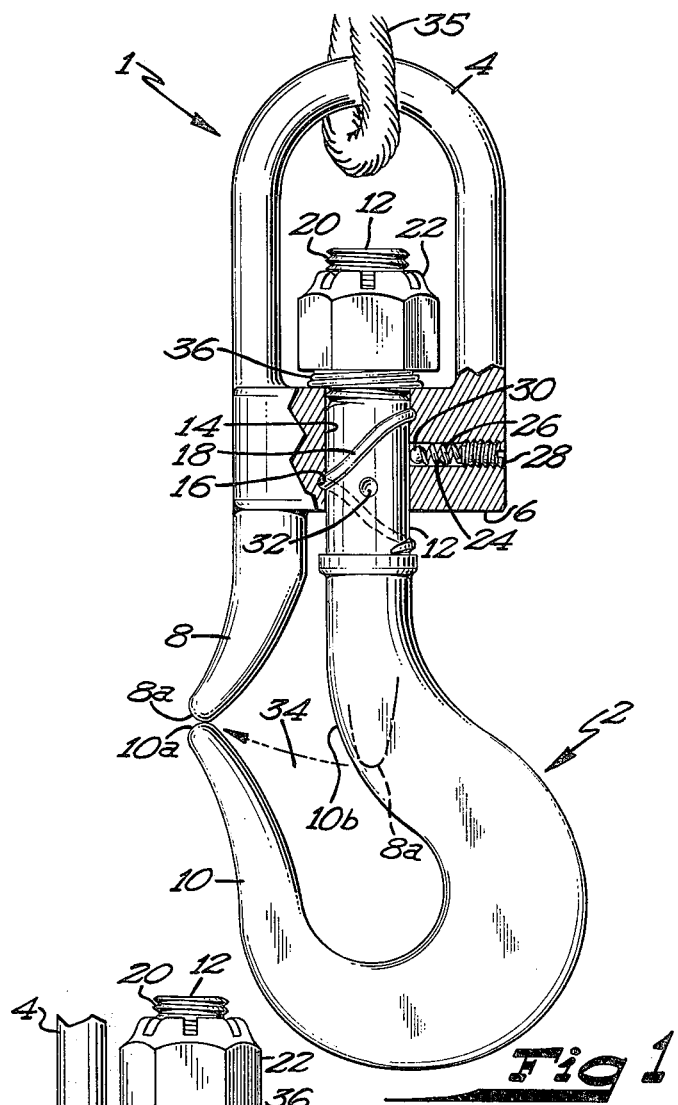
Fig 1
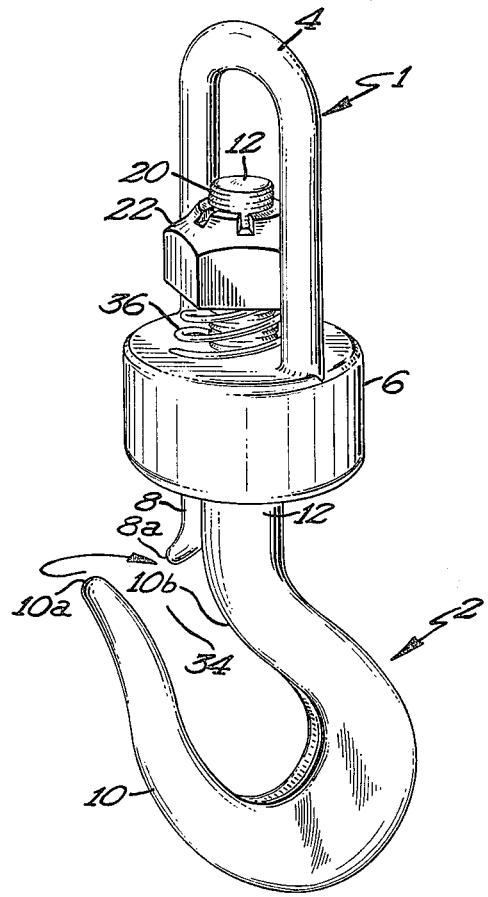
Fig 2
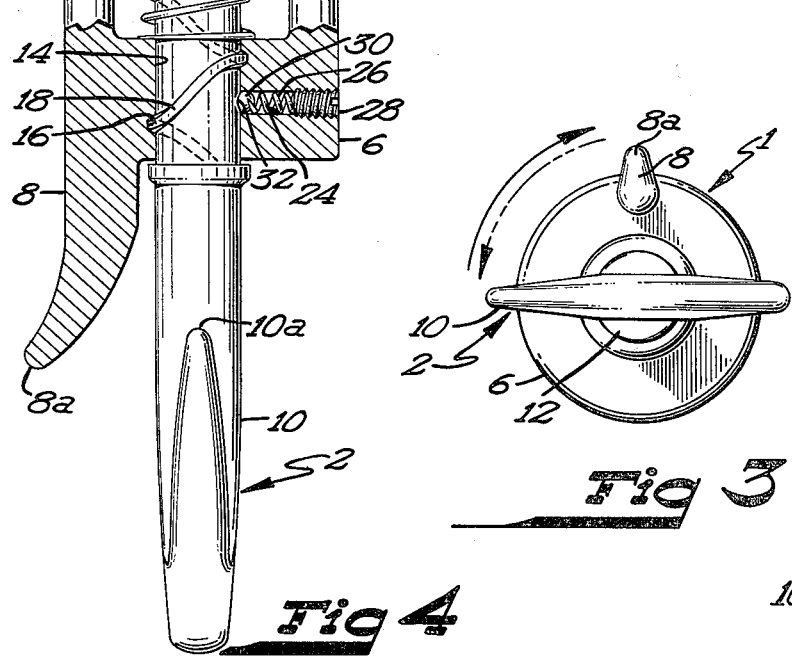
Fig 3
Fig 4
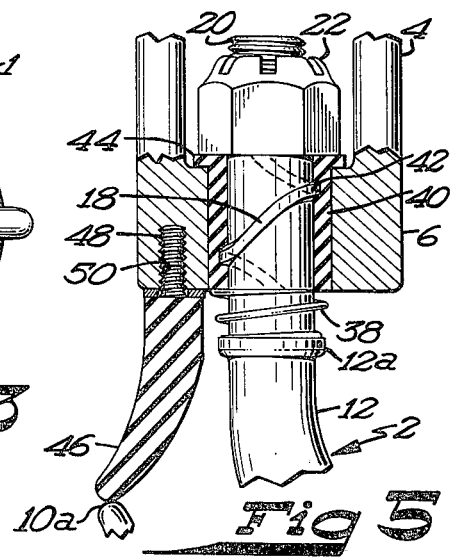
Fig 5

SELF-CLOSING LIFT HOOK

BACKGROUND OF THE INVENTION

Lift hooks having a safety catch or latch movable into a closed position across the hook throat opening are known and in use. However, such safety hooks require manual operation to engage and disengage the safety latch; and there is always the danger that the hook will be left open when being used to lift a load if the operator forgets to close the safety latch. See, for example, U.S. Pat. No. 3,430,307. I have developed a lift hook device which overcomes this disadvantage by rotatably coupling a lift hook to a cable attachment eye in such a way that the application of a load to the hook operates to automatically close a latch arm across the hook opening.

BRIEF SUMMARY OF THE INVENTION

The lift hook device of this invention is particularly characterized by a lift hook and cable attachment eye assembly threadedly coupled together so as to ensure that a latch arm on the eye rotates into a closed position across the hook throat opening and stays there whenever a load is applied to the hook. In addition to being self-closing, the hook and latch arm are also self-aligning.

These basic objectives and advantages are realized by forming mating positioning threads on an aperture in the eye base wall and on the hook shank so that with the hook shank rotatably supported within this eye aperture, the eye will move downwardly on the hook shank as the eye rotates on the positioning threads in an opening direction to displace the latch arm to an open position. The application of a downward weight load on the hook will cause the hook shank to move downwardly relative to the eye and thereby rotate the eye upwardly along the hook shank so as to automatically rotate the latch arm in the opposite direction to a closed position across the hook throat.

A nut threaded onto separate, load bearing threads formed on the upper end of the hook shank within the eye advantageously serves two functions. This nut transmits an applied weight load from the hook to the eye; and it also may be adjustably positioned on the hook shank to align the latch arm over the hook throat opening in the closed position of the eye by limiting the upward travel of the eye on the hook shank as it rotates towards its closed position.

A further beneficial aspect of my improved lift hook resides in the use of an electrically insulating sleeve in the aforesaid aperture in the eye base wall in combination with an insulating latch arm to electrically insulate the lift hook from the cable attachment eye. This prevents electric charges that could be picked up by a high crane boom from being conducted to a person handling the lift hook.

These and other objects and advantages of my invention will become readily apparent as the following description is read in conjunction with the accompanying drawings wherein like reference numerals have been used to designate like elements throughout the several views.

BRIEF DESCRIPTION OF THE DRAWINGS

FIG. 1 is a front elevation view, partially in section, showing the lift hook of this invention in its closed position;

FIG. 2 is a perspective view of the lift hook of FIG. 1 with the lift hook in its open position;

FIG. 3 is a bottom, plan view of the lift hook as it appears in FIG. 2;

FIG. 4 is a fragmentary, elevation view, partially in section, showing the open position of the lift hook of FIG. 2; and FIG. 5 is a fragmentary, elevation view, partially in section, of a modified form of the lift hook device.

DESCRIPTION OF THE PREFERRED EMBODIMENTS

Referring now to the drawings, I have shown in FIGS. 1 and 2 an embodiment of the lift hook device of this invention. The lift hook device is comprised of an eye generally indicated by reference numeral 1, and a hook 2. Eye 1 is comprised of an upwardly extending ring or hasp portion 4 which serves as a cable connector and a base wall 6. As is clearly indicated in FIG. 1, base wall 6 is of cylindrical shape. Latch means, preferably in the form of a latch arm 8 having an outer tip portion 8a projects downwardly and outwardly from base wall 6 as shown. Latch arm 8 operates to close the hook 2 in a manner hereinafter explained.

Hook 2 is comprised of a lower hook portion 10 having an upwardly extending tip 10a. Hook 2 further includes an upwardly extending, elongated shank 12 which terminates at its lower end in a hook stem portion 10b.

Hook shank 12 projects upwardly into the space within eye hasp 4 through an aperture 14 in eye base wall 6. A coarse positioning thread 16 is formed on base wall aperture 14, and is threadedly engaged by a mating positioning thread 18 formed on the outer surface of hook shank 12. With eye 1 in its normal upright position of use as shown in FIGS. 1 and 2, aperture 14 and hook shank 12 will be oriented vertically, generally at right angles to horizontally extending eye base wall 6. Relatively coarse positioning threads 16 and 18 provide substantial vertical displacement of eye base wall 6 and hook shank 12 relative to each other along the length of hook shank 12 for a minimum amount of rotational movement of eye 1 and hook shank 12 with respect to each other.

A separate, load bearing and transmitting thread 20 is formed on the upper end of hook shank 12. This thread is preferably a standard thread with a finer pitch than that of threads 16 and 18. A holding and stop nut 22 is threaded onto the upper end of shank 12 on threads 20. Nut 22 is positioned in overlying relation to the top face of eye base wall 6, and as is explained below with respect to the operation of my lift hook, co-operates with load bearing threads 20 to transmit the weight load applied to hook 2 to eye 1 through base wall 6. Nut 22 serves a second positioning function with respect to latch arm 8 in a manner hereinafter explained.

For the purpose of positively securing eye 1 and hook 2 in the open position to which latch arm 8 may be rotated, I provide a detent assembly in base wall 6. To this end, a transverse aperture 24 is formed horizontally within base wall 6 and houses a detent spring 26. A set screw 28 bearing on the outer end of detent spring 26 is utilized to adjust the spring pressure. A ball detent 30 positioned at the inner end of transverse aperture or recess 24 is normally urged inwardly by the biasing action of spring 26. A mating, circular recess 32 is formed in the shank 12 of hook 2. When eye 1 is rotated relative to hook shank 12 so as to move latch arm 8 to an open position as shown in FIGS. 2, 3 and 4, base wall 6 rotates downwardly along hook shank 12 to a position where detent ball 30 and recess 32 are aligned. With these elements aligned as shown in FIG. 4, detent ball 30 will serve to hold eye 1 in the open position to which it is rotated with respect to hook shank 12.

Those skilled in the art will readily appreciate that the hook device disclosed herein may be used in a well known manner with cranes, hoist and various kinds of lift devices to lift and carry various kinds of loads. In normal use, a cable or line will be looped through the upper end of eye hasp 4 and attached to a crane boom or other support means. In FIG. 1 I have shown such a cable 35 looped around the top end of eye hasp 4. When it is desired to attach a load to hook 2, eye 1 is rotated clockwise with respect to hook 2 in the direction indicated by the solid arrow in FIGS. 2 and 3. A ninety degree rotation of eye 1 relative to hook 2 in this manner is all that is required to completely open the throat 34 of hook 2 defined between hook tip 10a and hook stem portion 10b. With hook 2 so opened as shown in FIGS. 2, 3 and 4, a sling, cable or chain supporting a load may be readily inserted through hook throat 34 to rest on the upper face of lower hook portion 10. Since ball detent 30 will be operating in cooperation with hook shank recess 32 to hold eye 1 and hook 2 in the open positions to which they are rotated as shown in FIGS. 2 through 4, the operator will have both hands free to attach a cable, chain or sling to hook lower portion 10.

As may be noted most clearly by reference to FIGS. 1 and 4, the clockwise rotation of eye 1 to bring latch arm 8 to its open position causes eye 1 to rotate downwardly along hook shank 12 to a position where latch arm tip 8a will be below hook tip 10a. This relative rotation of eye 1 and hook 2 with respect to each other will of course also result in upward, vertical movement of hook shank 12 with respect to eye 1 to a position where nut 22 will be displaced above the top face of eye base wall 6 as shown in FIGS. 2 and 4. When the full weight of a load is applied to hook 2 in a downward direction, hook shank 12 will be caused to move downwardly relative to eye 1. This will cause eye 1 to rotate in a counterclockwise direction towards a closing position, as indicated by the dotted arrows in FIGS. 1 and 3. As eye 1 rotates in this counterclockwise closing direction, it will move upwardly on honk shank positioning thread 18 along shank 12. It will be appreciated that the upward travel of eye 1 will be limited by the stopping action of nut 22 against the top face of eye base wall 6. Nut 22 is adjusted at a predetermined position on upper shank thread 20 so as to stop the upward, rotational movement of eye 1 at a closing position wherein latch arm 8 will extend across hook throat 34 in a position of direct alignment with hook tip 10. With hook tip 10a and latch arm tip 8a substantially abutting in the closed position of eye 1 with respect to hook 2, hook throat 34 will be securely closed. As noted above, this closing action of latch arm 8 across hook throat 34 is inherently and automatically accomplished by the application of a weight load to hook 2. No manual operation is required to close latch arm 8 across the hook throat. Nut 22 may be adjusted on upper hook shank threads 20 so as to bring latch arm tip 8a and hook tip 10a into close proximity to each other in the closed position of arm 8, or these tips 8a and 10a may lightly abut against each other as shown in FIG. 1.

With a weight load applied to hook 2, nut 22 serves the additional purpose of transmitting the weight load from load bearing threads 20 to eye 1 through eye base wall 6. By virtue of this arrangement, threads 16 and 18 on eye aperture 14 and hook shank 12 serve only a positioning function for latch arm 8, and do not actually bear any of the load applied to hook 2.

For ease of handling, it may be desirable to provide some means for holding eye 1 and hook 2 in their normally open positions of relative rotation as shown in FIGS. 2, 3 and 4. For this purpose, a coil spring 36 is seated on the top face of eye base wall 6 around hook shank 12. Spring 36 bears at its upper end against the bottom of stop nut 22. With nut 22 adjusted on hook shank threads 20 to its proper stop position for closing latch arm 8 across hook throat 34, spring 36 will be loaded and will exert a biasing force on nut 22 and eye base wall 6 in a vertical direction so as to normally urge eye 1 towards its clockwise open position shown in FIGS. 2, 3 and 4. Spring 36 will thus function in cooperation with detent ball 30 to hold eye 1 and hook 2 in their open positions wherein latch arm 8 will be displaced at least ninety degrees away from hook tip 10a. With hook throat 34 normally open in this manner, a load can be readily applied to hook lower portion 10, with the application of the load then serving to close latch arm 8 across hook throat 34 in the manner explained above.

In FIG. 5 I have shown a modified embodiment of my improved lift hook wherein insulating means is provided to electrically insulate eye 1 from hook 2. In this embodiment, opening spring 36, which is also an optional feature, has been deleted. A closing spring 38 is shown in FIG. 5 between eye base wall 6 and a flange 12a on hook shank 12. Coil spring 38 will exert a biasing force in an upward direction on eye 1, and thereby normally urge eye 1 upwardly in its counterclockwise closing direction. In this manner, spring 38 may be utilized, where desired, to positively hold the latch arm in its closed position across hook throat 34 in alignment with hook tip 10. I anticipate that closing spring 38 will be utilized in those applications where it is desired to maintain hook 2 closed, even when no load is applied to it. It is of course understood that either opening spring 36 or closing spring 38 will be used on a particular lift hook, and that these two springs would not be used together.

The electrical insulation of eye 1 from hook 2 is accomplished by a combination of insulating elements. An electrically insulating sleeve 40 is positioned within aperture 14 of the eye bottom wall 6 to preclude electrical conduction between eye 1 and hook shank 12. The inner surface of insulating sleeve 40 will be formed to provide a positioning thread 42 comparable to thread 16 to accommodate positioning thread 18 on hook shank 12. An upper collar or washer element which preferably may take the form of an insulating collar 44 integrally formed with sleeve 40 on the top end thereof serves to electrically insulate and separate nut 22 from the top face of eye base wall 6. Also, because there is a possibility of electrical conduction between the latch arm and the tip 10a of hook lower portion 10 when the latch arm is in its closed position, a latch arm 46 made of rubber, Bakelite or other electrically insulating material may be utilized as shown in FIG. 5. Where such an insulating latch arm 46 is used, it will be separate from eye 1, and may be removably attached thereto by means of a threaded lug 48 provided on its upper end. Lug 48 is threadedly secured within a mating, threaded aperture 50 provided in eye base wall 6. Although latch arm 46 has been shown as made in its entirety of insulating material, it will of course be appreciated that if desired only the top portion of the latch arm may be made of electrically insulating material; or, the tip of the latch arm could be insulated by placing a nonconducting sleeve over it.

The combination of insulating sleeve 40, collar 44 and insulating latch arm 46 serves to completely electrically insulate and isolate hook 2 from eye 1. This feature is considered to be a desirable one because of the possibility that high crane booms which might be utilized in conjunction with the lift hook device can pick up radio frequencies and act as an antenna. Thus, an electrical charge picked up by the crane boom could be conducted through the lift cable, eye 1 and hook 2 to a person handling the lift apparatus. The combination of electrical insulating elements described above will prevent an operator from being shocked by such an electrical charge.

I anticipate that various changes can be made in the size, shape and construction of the lift hook device disclosed herein without departing from the spirit and scope of my invention as defined by the following claims.

What is claimed is:

1. A load lift hook device comprising:
   a lift cable engaging lift eye having a base wall;
   an aperture extending through said base wall of said eye, said aperture having a positioning thread formed thereon and being oriented vertically when said eye is in its normal upright position of use with said base wall extending horizontally;
   a hook having an elongated shank extending through said aperture into said lift eye, said shank having an external positioning thread thereon mating and engaged with said positioning thread in said aperture, said aperture and shank positioning threads being so constructed and formed that said eye moves downwardly on said hook shank and said shank thereby moves upwardly into said eye as said eye is rotated relative to said hook shank in a predetermined opening direction;
   an upwardly projecting tip on said hook spaced from an opposite, stem portion of the hook and defining therewith a throat opening on said hook; and
   latch means on said base wall of said lift eye cooperating with said hook tip in a closed position of said eye and hook to bridge the gap across said throat opening to close said hook, said latch means being rotatable with said eye to an open position of displacement away from said hook tip as said eye is rotated relative to said hook shank in said opening direction, whereby the application of a downward load force on said hook will cause said hook shank to move downwardly relative to said eye to thereby rotate said eye relative to said hook shank on said hook shank positioning thread in a closing direction opposite to said opening direction so as to automatically rotate said latch means to said closed position as said eye moves upwardly relative to said hook shank.

2. A lift hook device as defined in claim 1 wherein: said latch means comprises a latch arm projecting downwardly and outwardly from said base wall of said eye, said latch arm having an outer tip which is aligned with said hook tip in close proximity thereto when said eye and hook are rotated to said closed position.

3. A lift hook device as defined in claim 2 wherein:
   a separate, load transmitting thread is formed on the upper end of said hook shank and a nut is threadedly positioned thereon in overlying juxtaposition to said eye base wall, said nut being threadedly adjustable on said shank and serving to limit the upward, vertical movement of said eye base wall relative to said hook shank as said eye rotates towards said closed position, whereby said nut may be adjusted along the length of said hook shank to stop said eye at a predetermined position on said hook shank as said eye rotates in said closing direction, and thereby ensure the alignment of said latch arm with said hook tip in said closed position of said hook and eye, and said nut further serving to transmit the weight load applied to said hook to said eye base wall.

4. A lift hook device as defined in claim 3 wherein:
   an electrically insulating sleeve is positioned in said base wall aperture around said hook shank;
   an electrically insulating collar element is positioned around said base wall aperture under said nut, between said nut and the top face of said base wall; and
   said latch arm is made of electrically insulating material.

5. A lift hook device as defined in claim 1 wherein:
   a spring loaded detent element is positioned within an opening in said eye base wall and is normally urged towards said hook shank; and
   a recess formed in the external wall surface of said hook shank at a predetermined position, such that said recess will be aligned with said detent element to receive said detent element in locking engagement with said hook shank when said eye is rotated to said open position.

6. A lift hook device as defined in claim 1 wherein:
   an opening spring is seated on the top face of said eye base wall and bears at its upper end against spring stop means on the upper end of said hook shank, vertically spaced apart from said eye base wall whereby said spring normally biases said eye and hook shank apart to their rotationally separated open position.

7. A lift hook device as defined in claim 6 wherein:
   a separate, load transmitting thread is formed on the upper end of said hook shank and a nut is threadedly positioned thereon in overlying juxtaposition to said eye base wall, said nut serving as said spring stop means.

8. A load lift hook device comprising:
   a lift eye having a base wall;
   an aperture extending through said base wall, said aperture being oriented vertically when said eye is in its normal upright position of use with said base wall extending horizontally;
   a hook having an elongated shank extending through said aperture into said lift eye, said hook shank being threadably supported within said aperture, and said eye and said hook being rotatable relative to each other;

an upwardly projecting tip on said hook spaced from an opposite, stem portion of said hook and defining therewith a throat opening on said hook;

a latch arm projecting downwardly and outwardly from said base wall of said eye, said latch arm having an outer tip which is aligned with said hook tip in immediate proximity thereto when said eye and said hook are rotated to a closed position relative to each other wherein said latch arm cooperates with said hook tip to bridge the gap across said throat opening to close said hook, and said latch arm being rotatable with said eye to an open position of displacement away from said hook tip;

retention means on the upper end of said hook shank overlying the top face of said eye base wall and serving to transmit the weight of a load applied to said hook shank to said base wall, said retention means being electrically insulated from said base wall;

an electrically insulating sleeve positioned in said base wall aperture around said hook shank; and means electrically insulating at least the tip of said latch arm from said hook tip, whereby said eye is completely electrically insulated from said hook.

9. A lift hook device as defined in claim 8 wherein:

a load transmitting thread is formed on the upper end of said hook shank;

said retention means comprises a nut theadedly secured to said hook shank on said load transmitting thread; and said nut is electrically insulated from said eye base wall by an insulating ring positioned therebetween.

10. A lift hook device as defined in claim 8 wherein:

said sleeve in said base wall aperture has a positioning thread formed thereon;

said hook shank has an external positioning thread thereon mating and engaged with said positioning thread in said sleeve, said sleeve and shank positioning threads being so constructed and formed that said eye moves downwardly on said hook shank and said shank thereby moves upwardly into said eye as said eye is rotated relative to said hook shank to position said eye and hook in said open position, whereby the application of a downward load force on said hook will cause said hook shank to move downwardly relative to said eye to thereby rotate said eye relative to said hook shank on said hook shank positioning thread in a closing direction opposite to said opening direction so as to automatically rotate said latch arm to said closed position as said eye moves upwardly relative to said hook shank.

* * * * *